Feb. 28, 1956  W. T. SHERMAN  2,736,104
CAR LIFT WHEEL ALIGNMENT APPARATUS
Filed Feb. 11, 1955  4 Sheets-Sheet 2
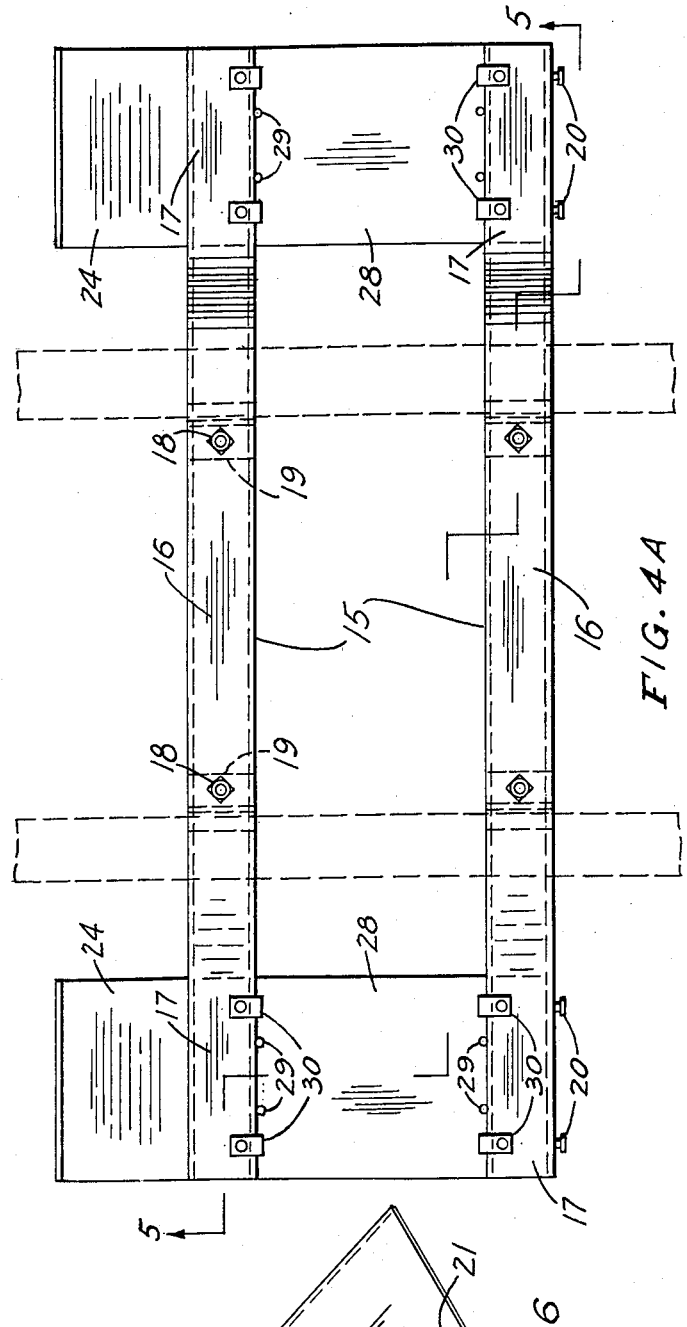
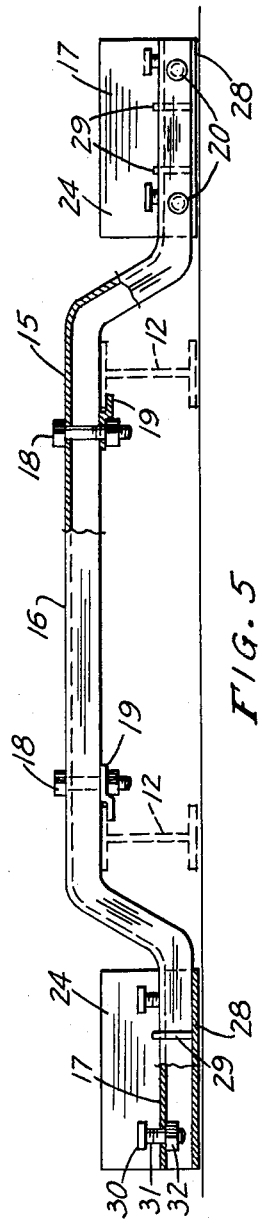
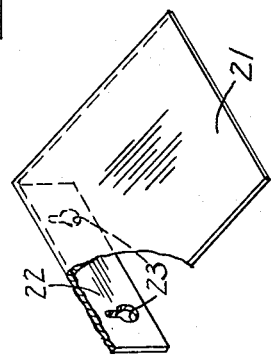
WILLARD T. SHERMAN
INVENTOR.
BY
McMorrow, Berman + Davidson
ATTORNEYS Feb. 28, 1956 W. T. SHERMAN 2,736,104
CAR LIFT WHEEL ALIGNMENT APPARATUS
Filed Feb. 11, 1955 4 Sheets-Sheet 3
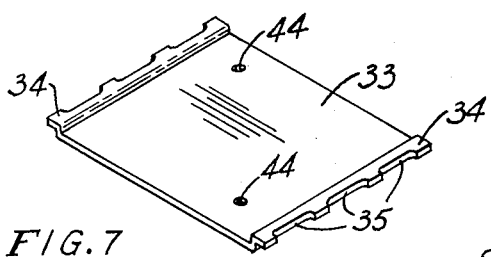
FIG. 7
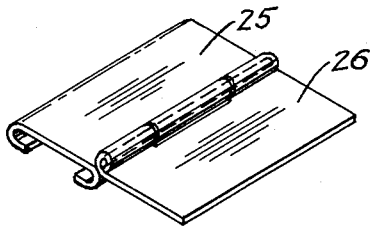
FIG. 11
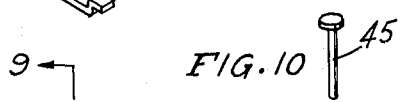
FIG. 10
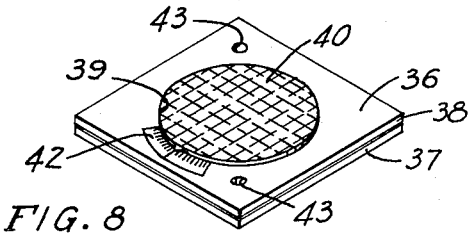
FIG. 8
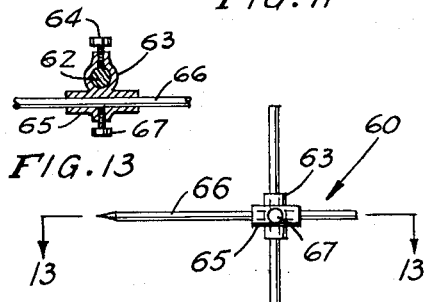
FIG. 13
FIG. 12
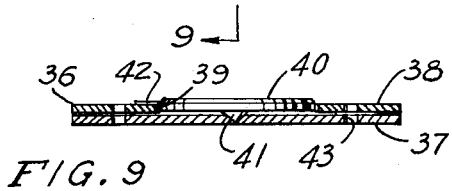
FIG. 9
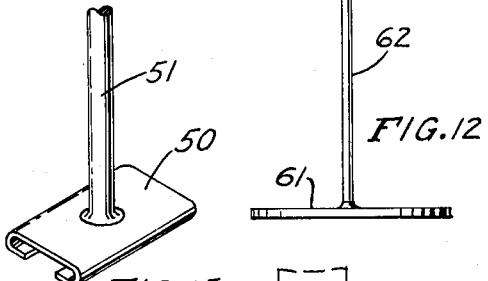
FIG. 15
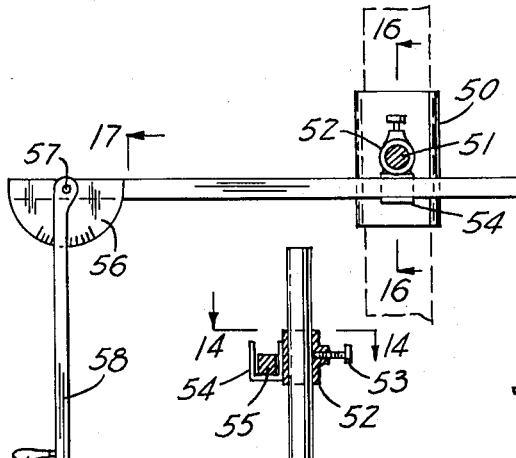
FIG. 14
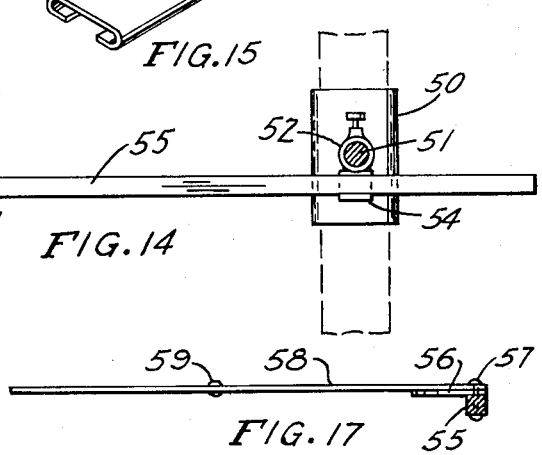
FIG. 17
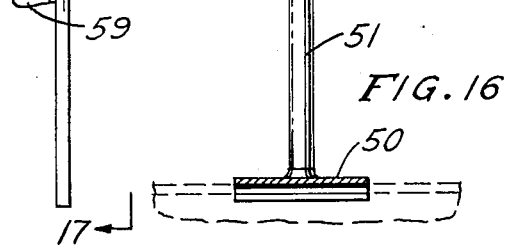
FIG. 16
WILLARD T. SHERMAN
INVENTOR.
BY
McMorrow, Berman + Davidson
ATTORNEYS Feb. 28, 1956  W. T. SHERMAN  2,736,104
CAR LIFT WHEEL ALIGNMENT APPARATUS
Filed Feb. 11, 1955  4 Sheets-Sheet 4
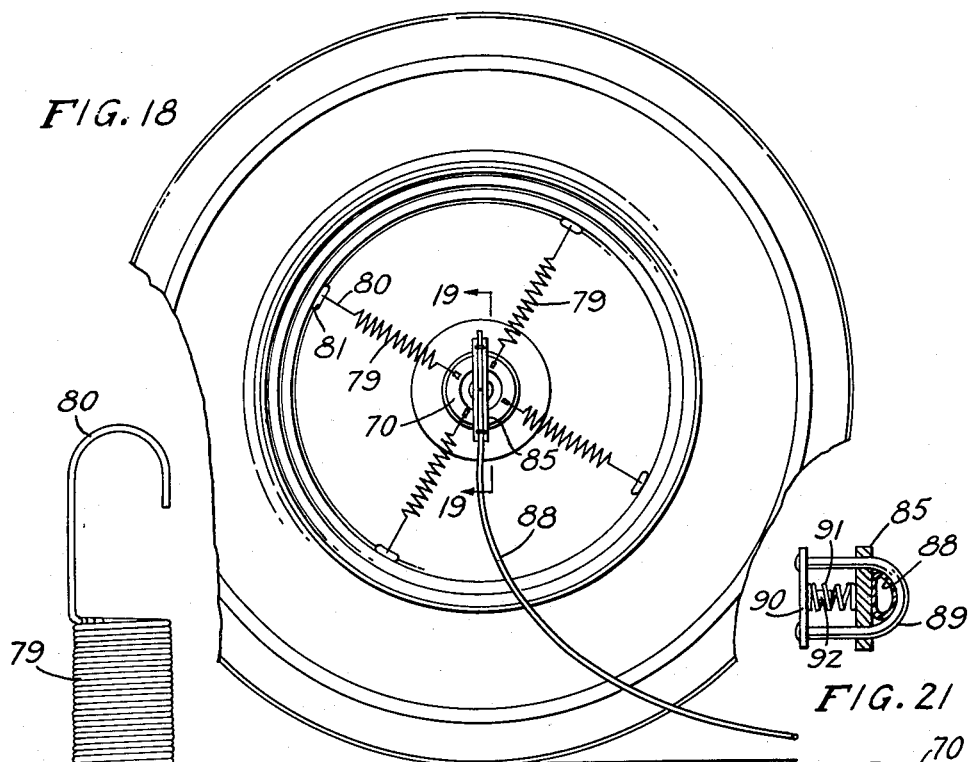
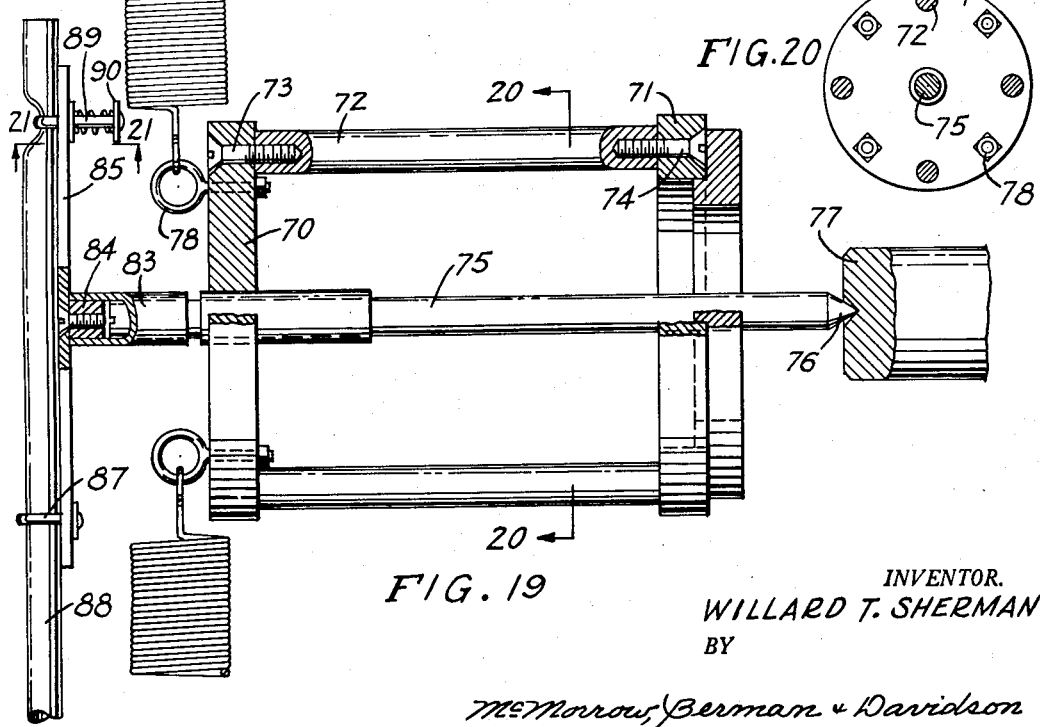
INVENTOR.
WILLARD T. SHERMAN
BY
McMorrow, Berman & Davidson
ATTORNEYS

United States Patent Office 2,736,104
Patented Feb. 28, 1956

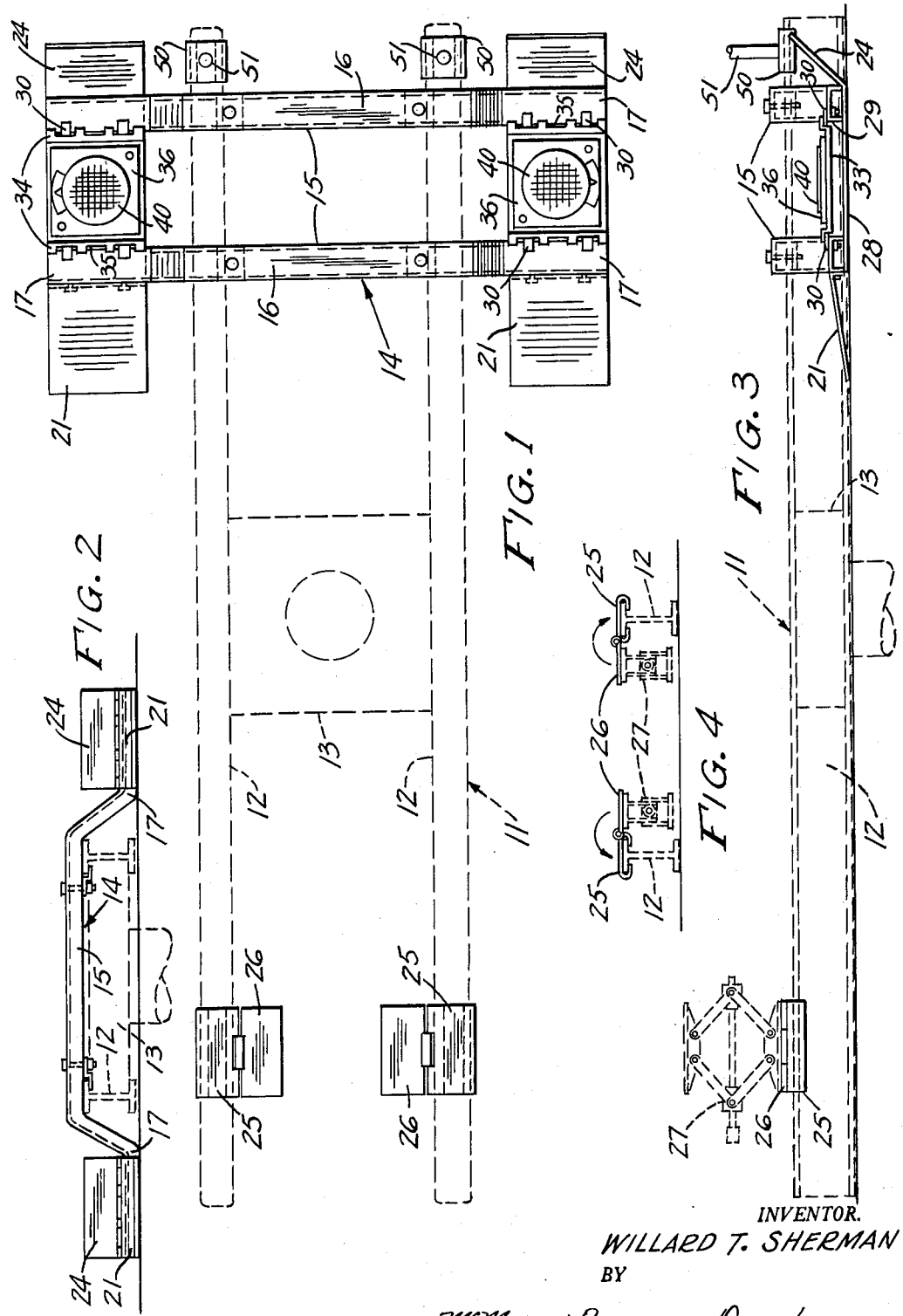

1

2,736,104

CAR LIFT WHEEL ALIGNMENT APPARATUS

Willard T. Sherman, Kauneonga Lake, N. Y.

Application February 11, 1955, Serial No. 487,576

3 Claims. (Cl. 33—203.12)

This invention relates to apparatus for measuring the wheel alignment characteristics of motor vehicles, and more particularly to an improved motor vehicle wheel alignment checking apparatus adapted to be employed on a hydraulic motor vehicle lift.

A main object of the invention is to provide a novel and improved motor vehicle wheel alignment checking apparatus adapted to be employed with conventional hydraulic lift equipment, said apparatus involving inexpensive components, being easy to install on a motor vehicle hydraulic lift device, and providing a means of rapidly checking the front wheel alignment of a motor vehicle on the lift.

A further object of the invention is to provide an improved motor vehicle front wheel alignment checking apparatus which involves simple components, which may be rapidly mounted on the main frame of a conventional hydraulic lift, and which enables the operator thereof to accurately and rapidly measure the wheel alignment characteristics of a motor vehicle with a minimum amount of labor and while performing other work on the motor vehicle, such as for example while lubricating the vehicle.

Further objects and advantages of the invention will become apparent from the following description and claims, and from the accompanying drawings, wherein:

Figure 1 is a top plan view showing the main components of an improved wheel alignment checking apparatus according to the present invention, shown with the parts thereof arranged on the main frame of a hydraulic lift, the hydraulic lift being shown in dotted view;

Figure 2 is a front end elevational view of the apparatus of Figure 1;

Figure 3 is a side elevational view of the apparatus of Figure 1;

Figure 4 is a rear end elevational view of the apparatus of Figure 1 with the rear vehicle supporting devices thereof shown in depending positions;

Figure 4A is an enlarged top plan view of the subframe of the apparatus employed for supporting the forward portion of a motor vehicle on the lift;

Figure 5 is a cross sectional view taken on line 5—5 of Figure 4A;

Figure 6 is a perspective view, partly broken away, of a ramp element employed with the apparatus of Figures 4A and 5;

Figure 7 is a perspective view of one of the trough members employed with the apparatus of Figures 4A and 5;

Figure 8 is a perspective view of one of the indicator plate assemblies employed in the apparatus and received in the trough member of Figure 7;

Figure 9 is a cross sectional view taken on the line 9—9 of Figure 8;

Figure 10 is a perspective view of one of the locking pins employed to secure the indicator plate assemblies of Figure 8 to the trough member of Figure 7;

Figure 11 is a perspective view of one of the rear supports employed in conjunction with the apparatus of Figures 4A to 10;

Figure 12 is a side elevational view of an adjustable wheel height gauge device adapted to be employed with the apparatus shown in Figures 1 to 11 for checking the alignment of the front wheels of a motor vehicle;

Figure 13 is an enlarged fragmentary cross sectional detail view taken on the line 13—13 of Figure 12;

Figure 14 is a horizontal cross sectional view taken on line 14—14 of Figure 16 illustrating another wheel alignment checking attachment forming part of the present invention and being adapted to be mounted on the main frame of the hydraulic lift and to be employed in conjunction with the apparatus illustrated in Figures 1 to 12;

Figure 15 is a fragmentary perspective view showing the lower portion of one of the standards employed with the wheel alignment checking attachment of Figure 14;

Figure 16 is a vertical cross sectional view taken on line 16—16 of Figure 14;

Figure 17 is a vertical cross sectional view taken on line 17—17 of Figure 14;

Figure 18 is a fragmentary side elevational view of one of the wheels of a vehicle mounted on the apparatus of Figures 1 to 11 and showing a portion of a modified form of height gauge device engaged on the wheel in accordance with the present invention for checking the relative heights of the respective wheels of the vehicle and enabling the vehicle to be properly leveled so that the wheels are all at the same height;

Figure 19 is an enlarged cross sectional view taken on the line 19—19 of Figure 18;

Figure 20 is a cross sectional view to a reduced scale, taken on the line 20—20 of Figure 19; and Figure 21 is an enlarged cross sectional detail view taken on the line 21—21 of Figure 19.

Referring to the drawings, 11 designates generally a conventional hydraulic lift employed for elevating motor vehicles, for example, for preforming servicing operations on the vehicles, such as lubrication, or the like. The lift device 11 comprises a main frame having the parallel, longitudinally extending I-beams 12, 12 which are secured at their intermediate portions to an elevating structure 13 operated by a suitable hydraulic cylinder.

Designated generally at 14 is a transversely extending subframe comprising a pair of parallel transverse channel bars 15, 15, said channel bars being inverted so as to be downwardly concave, as clearly shown in Figure 5, and being formed with the relatively elevated intermediate portions 16 and the downwardly offset horizontal end portions 17, 17. Secured to the intermediate portion 16 of each of the channel bars 15 by respective bolts 18 are respective clamp members 19 formed to lockingly engage beneath the inner portions of the top flanges of the longitudinal beams 12, 12 of the main frame, as is clearly shown in Figure 5, whereby the subframe 14 may be secured in a desired adjusted position on the forward portion of the main frame 11.

The rearwardly facing sides of the downwardly offset portions 17, 17 of the rearward channel bar 15 are provided with the respective pairs of headed studs 20, 20 as shown in Figure 4A. Designated at 21, 21 are respective ramp plates which are formed with depending front flanges 22 having keyhole slots 23, 23 therein, said keyhole slots being adapted to lockingly engage with the studs 20, 20, whereby the ramp plates 21, 21 may be detachably secured, to the rearward transverse channel bar 15, as shown in Figure 1, to facilitate the ascent of the front wheels of a motor vehicle when the vehicle is being placed on the lift.

The downwardly offset end portions 17, 17 of the forward transverse channel bar 15 has secured thereto the forwardly and upwardly inclined stop plates 24, 24 which serve as chock blocks for limiting forward movement of the vehicle front wheel and for preventing the front wheels of the vehicle from rolling off the lift.

Slidably engaged on the rear end portions of the respective I-beams 12, 12 are the sleeve members 25, 25, said sleeve members slidably engaging the top flanges of the I-beams 12, 12, as shown in Figure 4. Hinged to each sleeve member 25 is a plate 26 carrying a conventional scissor jack 27, the scissor jacks 27 being disposed in depending positions when the plates 26 are arranged in horizontal coplanar positions relative to the top portions of the associated sleeve 25, as shown, for example, in Figures 1 and 4, the plates 26 being rotatable to positions overlying the sleeves 25, whereby the scissor jacks 27 are then directed upwardly, as shown in dotted view in Figure 3. Thus, when the lift is in a lowered position, the plates 26 may be in the positions shown in Figures 1 and 4, whereby the jacks 27 are in depending, non-obstructing positions, allowing the motor vehicle to be moved so that its front wheels can mount the subframe 14, as will be presently described, after which the plates 26 may be rotated upwardly and outwardly to positions wherein said plates rest on the top portions of the sleeve 25 and wherein the scissor jacks 27 are directed upwardly. The scissor jacks may then be employed to supportingly engage the rear portions of the motor vehicle when the main frame of the hydraulic lift is elevated.

The bottom edges of the downwardly offset end portions 17, 17 of the transverse channel bars 15, 15 are rigidly connected at each side of the main frame of the lift 11 by respective longitudinally extending horizontal plates 28, 28. Secured to the inside surfaces of the downwardly offset end portions 17 of the channel bars 15, 15 are the respective pairs of vertical pins 29, 29, said pins rising above the horizontal plane of the top surfaces of the respective downwardly offset end portions 17, 17, as shown in Figure 5. Each of said downwardly offset portions 17 is provided with a pair of vertically adjustable supporting bars 30, 30, said bars being mounted on threaded shanks 31 which are threadedly engaged in the downwardly offset portions 17 of the channel bars 15, as by being threadedly engaged in nuts 32 welded to the undersides of the top wall of said downwardly offset portions 17, as shown in Figure 5. The supporting bars 30, 30 are spaced symmetrically on opposite sides of the respective pins 29, 29, as shown in Figure 4A, and the supporting bars 30 are arranged so that they project inwardly over the trough-like space defined between the depressed end portions 17, 17 of the transverse channel bars 15, 15.

Receivable in each trough-like space, above defined, is a trough-like plate member 33, shown in Figure 7, said plate member having the upwardly offset end flanges 34, 34 adapted to be supported on the inwardly extending supporting bars 30, the flanges 34 being each formed with three or more longitudinal notches 35. The trough-like plates 33 are arranged so that the pins 29, 29 provided on each depressed transverse bar end portion 17 will be engageable in a selected pair of notches 35, whereby the trough-like plate members 33 may be positioned in desired adjusted positions on the depressed bar end portion 17, corresponding to the wheel spacing of the vehicle to be supported on the lift.

As will be apparent from the above, the height of each trough-like member 33 may be regulated by adjusting the heights of the supporting bar elements 30.

Each trough-like plate 33 receives a rectangular plate assembly 36 comprising a bottom plate 37 and a top plate 38, the top plate 38 being formed with a circular central aperture 39 in which is rotatably disposed a wheel alignment indicator disc 40, said disc having a depending conical central pivot portion 41 engageable in a correspondingly shaped conical recess provided in the bottom plate 37. A scale 42 is provided at the edge of the circular opening 39 adjacent the calibrated edge of the disc 40, as shown in Figure 8, whereby the angular position of each disc 40 may be read by reference to the scale 42.

The plate assemblies 36 are provided with respective pairs of openings 43, 43 which are registrable with similar openings 44, 44 in the trough-like plates 33, locking pins 45 being provided for insertion in the registered openings 43 and 44 to secure the plate assemblies 36 rigidly in the trough-like plates 33.

With the apparatus arranged as in Figures 1 and 4, a motor vehicle may be moved to a position wherein the front wheels thereof ascend the ramps 21, 21 and rest on the turntable members comprising the discs 40 and their supporting plate assemblies 36. The rear plates 26, 26 may then be swung to positions overlying their associated sleeve elements 25, 25, as above described, and the scissor jack members 26 may be operated to supportingly engage the bottom of the vehicle. The vehicle may then be elevated on the lift.

Manual rotation of the front wheels of the vehicle will cause the disc members 40 to rotate, and will provide information as to the correct alignment or lack of alignment of the wheels.

Slidably engaged on the forward ends of the respective I-beams 12, 12 of the main frame of the lift are the respective rectangular sleeve members 50, 50 to which are secured the respective upstanding vertical post elements 51, 51. Adjustably secured on each upstanding post member 51 is a sleeve 52 provided with a set screw 53 for locking the sleeve in a vertically adjusted position on the post member. The sleeves 52 are provided with the respective U-shaped cradle elements 54 which are transversely aligned and which receive the transversely extending square bar 55, as shown in Figure 14. The U-shaped cradle elements 54 are substantially rectangular in shape, whereby the bar 55 engages in said cradle elements and is held against rotation therein. Secured to one end of the bar 55 is the semi-circular, angularly calibrated plate member 56. Pivotally secured at 57 to the bar 55, centrally of the plate member 56 is the straight rod 58, said rod 58 extending horizontally, and being provided at its intermediate portion with a handle 59, whereby the rod may be engaged against one of the front wheels of the vehicle to determine the direction of the plane of the wheel by reference to the angled scale on the semi-circular plate member 56. Thus, further information with respect to the alignment or lack of alignment of the wheel may be obtained.

Referring to Figures 12 and 13, a height gauge 60 is provided, said gauge comprising a base 61 on which is rigidly secured a vertical upstanding post member 62. Slidably engaged on the post member 62 is a sleeve 63 provided with a set screw 64 (Figure 13), whereby the sleeve 63 may be locked in an adjusted position on the post member 62. Rigidly secured to the sleeve 63 transversely thereto is a horizontally extending sleeve 65 through which extends the horizontal pointer rod 66. The sleeve 65 is provided with the set screw 67 for locking the pointer 66 in an adjusted position in the sleeve 65.

The height measurement device 60 may be employed to compare the height of corresponding points on the respective front wheels of the vehicle and to thus obtain additional information with respect to the alignment or lack of alignment of the front wheels.

Referring now to Figures 18, 19, 20 and 21, a modified form of height measurement and wheel level checking apparatus according to the present invention is illustrated, the apparatus comprising a disc member 70 which is secured to a ring member 71, arranged parallel to the disc member 70, by four equally spaced rods 72 which are fastened respectively at their ends to the peripheral portion of disc 70 and to the ring member 71 by fastening screws 73 and 74, as shown in Figure 19. Secured centrally and extending axially through the disc member 70 is a rod 75 which extends centrally through the ring 71 and which is provided with the pointer tip 76 adapted to be engaged with the center of the hub 77 of a wheel. Secured to the peripheral portion of the disc member 70 and spaced evenly between the fastening screws 73 are eye bolts 78. Respective springs 79 are connected at their ends to the respective eye bolts 78, said springs being provided at their opposite ends with hooks 80 which are engageable in the respective peripheral rim slots 81 of a vehicle wheel in the manner illustrated in Figure 18.

Secured on the end of the rod 75 is a sleeve element 83 in the end of which is secured a stud member 84 which in turn is secured to the mid portion of a vertical plate-like strip 85 of suitable rigid material.

The lower portion of the strip 85 is provided with a guide loop 87 through which extends a flexible tube 88 of transparent material, such as flexible transparent plastic material, the tube 88 being freely slidable through the loop 87. The upper portion of the tube 88 is engaged through a U-shaped clamping loop 89 whose legs extend slidably through the strip 85 and are connected by a transverse bar 90, as shown in Figure 21. A coiled spring 91 has one end portion thereof engaged on a guide stud 92 secured on the bar 90 and has its other end portion engaging the rigid strip 85, whereby the loop 89 is biased into clamping engagement with the tube 88 to lock the tube in an adjusted position along the strip 85 the tube being releasable by exerting a sufficient force on the bar 90 to move the bight portion of the loop 89 away from the tube 88, thus allowing the tube to be moved longitudinally along the strip 85 to obtain a desired adjustment of the tube.

The various wheels of the vehicle on the apparatus are provided with respective supporting structures such as that shown in Figures 18 to 21, and a flexible transparent tube 88 is employed, one end of the tube being engaged with one of the structures and the other end of the tube being successively engaged with the structures associated with the remaining wheels of the vehicle so that each of the remaining wheels may be respectively leveled with respect to the initial wheel. Thus, the tube 88 contains a sufficient quantity of a suitably colored liquid so that the level of the liquid in the end portion of the tube associated with the first, or reference wheel, is substantially in alignment with the center of the hub of said reference wheel. In order to level another wheel with the reference wheel, the height of said other wheel is adjusted until the height of the liquid in the end portion of the tube fastened to said other wheel is the same as the height of the liquid in the end portion of the tube fastened to the reference wheel. It will be readily understood that this procedure may be successively performed for each of the three other wheels of the vehicle to adjust the heights of said other wheels to agree with the height of the reference wheel.

It will be readily apparent that the wheels of a vehicle mounted on the apparatus of Figures 1 to 11 may be thus readily leveled with respect to each other by using the devices illustrated in Figures 18 to 21, regardless of the irregularity or slope of the floor of the shop, thus facilitating the accurate subsequent alignment of the vehicle wheels.

While a specific embodiment of an improved wheel alignment apparatus for use in conjunction with a motor vehicle hydraulic lift has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle lift device, a longitudinal main frame, a transverse subframe adjustably secured on the forward portion of said main frame, said subframe comprising a pair of transverse, inverted, channel-shaped bars having horizontal, downwardly offset opposite end portions on the opposite sides of the main frame, vertically adjustable support elements mounted on said end portions, respective trough-like members on the end portions of the bars, said trough-like members having upwardly offset opposite end flanges supportingly engaged on said support elements, indicator plates disposed in said trough-like members between said end portions, respective wheel alignment indicator discs rotatably mounted on said indicator plates, said indicator discs being arranged to underlie the front wheels of a motor vehicle, and means adjustably mounted on the rear portion of said main frame and arranged to underlie and support the rear portion of the motor vehicle.

2. In a motor vehicle lift device, a longitudinal main frame, a transverse subframe adjustably secured on the forward portion of said main frame, said subframe comprising a pair of transverse, inverted channel-shaped bars having horizontal downwardly offset opposite end portions on the opposite sides of the main frame, vertically adjustable support elements mounted on said end portions, respective trough-like members on the end portions of the bar, said trough-like members having upwardly offset opposite end flanges supportingly engaged on said support elements, indicator plates disposed in said trough-like members between said end portions, respective wheel alignment indicator discs rotatably mounted on said indicator plates, said indicator discs being arranged to underlie the front wheels of a motor vehicle, respective rear support members mounted for longitudinal adjustment on the rear portions of the opposite sides of said main frame, and respective jacks hinged to said rear support members and being swingable into positions underlying the rear portions of a motor vehicle whose front wheels are disposed on said indicator discs.

3. In a motor vehicle lift device, a longitudinal main frame, a transverse subframe adjustably secured on the forward portion of said main frame, said subframe comprising a pair of transverse, inverted channel-shaped bars having horizontal, downwardly offset opposite end portions on the opposite sides of the main frame, vertically adjustable support elements mounted on said end portions, respective trough-like members on the end portions of the bars, said trough-like members having upwardly offset opposite end flanges supportingly engaged on said support elements, each end flange being formed with a plurality of notches, vertical abutment elements secured to said end portions and being lockingly engageable in said notches to limit displacement of said trough-like members, indicator plates disposed in said trough-like members between said end portions, respective wheel alignment indicator discs rotatably mounted on said indicator plates, said indicator discs being arranged to underlie the front wheels of a motor vehicle, and means adjustably mounted on the rear portion of said main frame and arranged to underlie and support the rear portion of the motor vehicle.

References Cited in the file of this patent

UNITED STATES PATENTS

| | | |
|---|---|---|
| 1,915,024 | Logette et al. | June 20, 1933 |
| 2,025,051 | Haucke | Dec. 24, 1935 |
| 2,285,989 | Kroll | June 9, 1942 |
| 2,720,036 | Berger | Oct. 11, 1955 |